April 17, 1928.

R. M. SHERRILL

ADVERTISING DEVICE

Filed Sept. 21, 1926    2 Sheets-Sheet 1

1,666,721

Inventor:
Richard M. Sherrill
By Gillson, Mann & Cox, Attys.

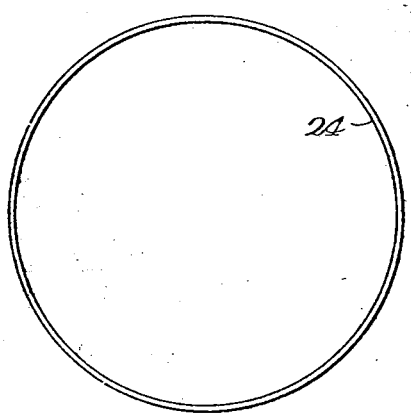
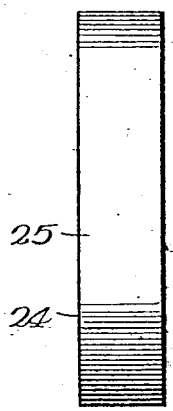
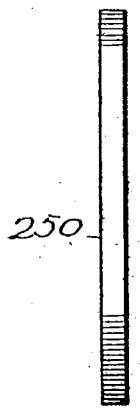
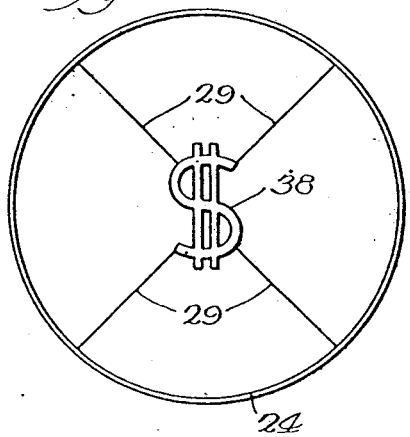
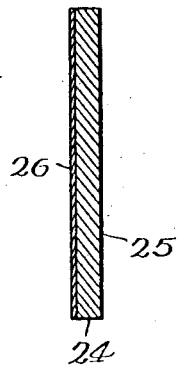
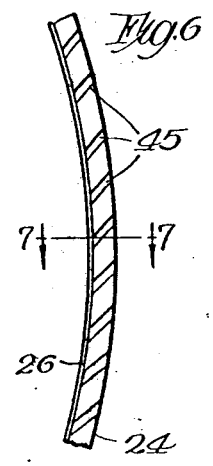

Patented Apr. 17, 1928.

1,666,721

UNITED STATES PATENT OFFICE.

RICHARD M. SHERRILL, OF EVANSTON, ILLINOIS, ASSIGNOR TO CENTRAL SCIENTIFIC COMPANY, A CORPORATION OF ILLINOIS.

ADVERTISING DEVICE.

Application filed September 21, 1926. Serial No. 136,889.

This invention relates to display or advertising devices and more particularly to advertising devices having moving parts.

One of the objects of the invention is the provision of a new and improved advertising device that when in operation will have the appearance of a transparent rotating sphere.

Another object of the invention is the provision of a new and improved display device together with means for illuminating the same with different colored lights.

A still further object of the invention is the provision of a new and improved display device with means for illuminating the rotating part thereof, that is cheap to manufacture, simple in construction, composed of a minimum number of moving parts, that is easily assembled and that is so constructed and arranged that the rotating part will appear to be continually changing in appearance and will appear to be variegated by the reflection of various tints and blended colors.

Other and further objects and advantages of the invention will appear from the following description taken in connection with the accompanying drawings, in which:

Fig. 3 is a side elevation of the ring;

Fig. 4 is an elevation of the ring at right angles to that shown in Fig. 3;

Fig. 5 is a view similar to that shown in Fig. 4 but showing the modified form of ring;

Fig. 6 is an edge view of a portion of a ring on an enlarged scale;

Fig. 7 is a sectional line 7—7 of Fig. 6; and

Fig. 8 is a side elevation of a modified form of ring.

Figure 1:
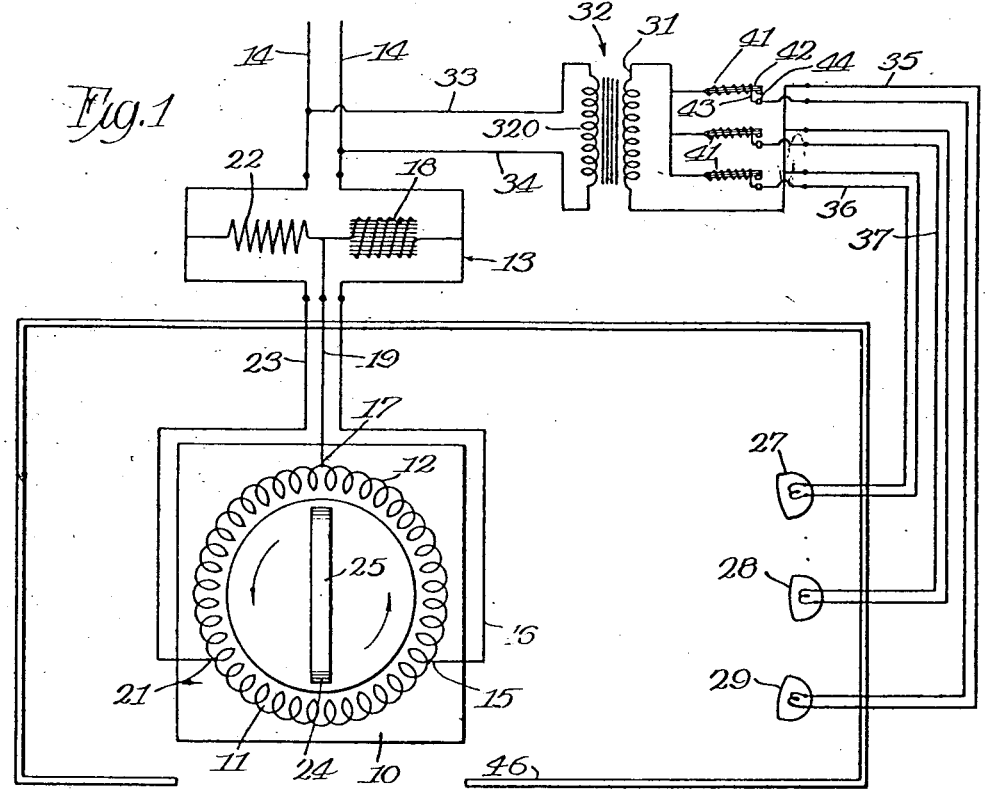
Fig. 1 is a diagrammatic view of the device.

It has long been known that in order to attract the attention of the public, a display or advertising device should possess changing parts, preferably moving parts, that are visible to the observer. It is also equally well known that the attention may be retained if the device possesses an element of mystery or the cycle of change be prolonged or indefinite.

The present invention seeks to combine these elements in the provision of a device having moving parts of a pleasing or attractive appearance, one which contains an element of mystery and one in which the cycle of change is of indefinite duration.

Referring now to the drawings in which similar reference characters designate the same parts throughout the specification, the reference character 10 designates a casing or cabinet in which is mounted a conventional Gramme ring 11 comprising a tapped field winding 12. This winding is supplied with a current in such a manner as to produce a rotatory magnetic field. As shown, a single phase alternating current is supplied to the ring through a phase splitting device 13 from the leads or mains 14. The lead 14 is connected to the winding 12 at 15 by the conductor 16, at 17 by the choke coil 18 and conductor 19, and at 21 by the choke coil 18, the non-inductive resistance 22 and the conductor 23. The Gramme ring is preferably concealed within the casing 10 as indicated in Fig. 2.

The casing 10 is provided with a seat for receiving a large watch glass 5 or other element for supporting the spinning object. This glass is preferably though not necessarily arranged axially of the Gramme ring. It is located within the rotatory magnetic field and any light object affected thereby when placed in the dish and given a start will continue to gyrate or spin so long as the magnetic field is maintained.

The display object is preferably a ring 24 formed of a thin narrow endless strip of metal such as aluminum. The outer surface 25 is preferably highly polished and its inner surface may be covered with a white coating of suitable material as paint or enamel as indicated on an enlarged scale at 26 in Fig. 7.

Figure 2:
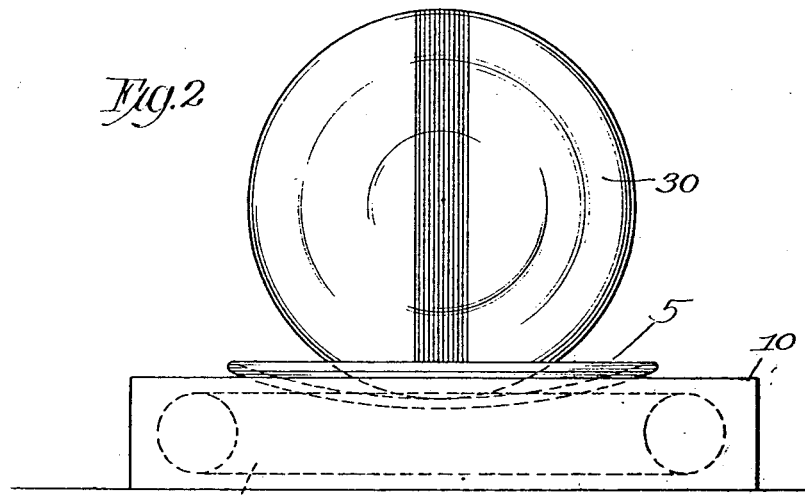
Fig. 2 is a front elevation of the device.

An object of this type will have the appearance of a glass ball while it is spinning or being rotated under the influence of the rotatory magnetic field, as indicated at 30 in Fig. 2. The illusion is, if anything, more perfect if the endless band be very narrow as indicated by the ring 250 in Fig. 5.

If desired, a legend 38 may be suspended by light wires or threads 29 within the ring. The legend is clearly visible and discernible while the ring is spinning and appears to be located within a glass ball or sphere.

The effect may be heightened very materially by providing a plurality of colored lights for illuminating the spinning object.

Preferably these lights are so controlled that each will come on at irregular intervals so that at one instant the spinning object will appear to be a glass ball of one color changing to a different color the next instant and so on indefinitely.

Any suitable number of colored lights may be employed. As shown, a red light 27, a green light 28 and a yellow light 29 are employed which not only give these three primary colors but numerous other effects are produced by their various combinations.

Suitable means are employed for energizing these lights at irregular intervals. As shown, the lights 27, 28 and 29 are connected in parallel in the secondary circuit 31 of the transformer 32. The primary winding 320 of said transformer is supplied with electrical energy from the leads or mains 14 through the conductors 33 and 34. Each of the light circuits 35, 36 and 37 is provided with means for automatically opening and closing the respective circuits intermittently. Any suitable or well known means may be employed for this purpose. One form of device is shown more or less diagrammatically in Fig. 1 and consists of a bimetallic thermostat 41 for each circuit. Since each switch is the same only one need be described. The thermostat is so constructed that the switch is normally open. The thermostat is caused to close the switch by heating the bimetallic strip 42 by means of a fine wire 43 of high resistance wound about the thermostat and attached to the secondary winding 31 of the transformer and to the contact 44 of the switch. A current passing through the fine wire 43 will become heated and in turn heat the thermostat and cause the same to flex and close the switch. The resistance of the wire 43 will prevent sufficient current from passing therethrough to energize the light but the instant the switch is closed the current will pass through the thermostat thus energizing the corresponding light and at the same time permitting the thermostat to cool and flex in the opposite direction thereby opening the switch. The opening and closing of the switches will each take place at irregular intervals thus energizing each of the lights intermittently but at irregular intervals whereby the spinning object will be illuminated by different colors and combinations of colors. At one instant the object, which appears to be a spinning transparent sphere, may be red, at the next green or yellow or perhaps some other color produced by the combination of two or more of these colors and then changing to various other tints and combinations of colors in an endless variety of variegated reflections which are calculated to intrigue the attention of the passerby. The variety of the tints and colors and their numerous changes with no regularity in their recurrence are adapted to retain the attention of the observer almost indefinitely.

It has been found that if the chatter marks 45 made by the cutting tool and shown considerably enlarged in Fig. 6 be left on the edges of the spinning ring, the result will be high light reflections which taken together with the shades and shadows, the blending of colors and the different tints reflected from the surface of the spinning object will very materially enhance the fascinating appearance of what looks like a mysterious rotating transparent sphere of ever changing colors and variegated hues.

Preferably the ring, phase splitting device, the transformer and the switches are concealed. The lights 27, 28 and 29 may also be concealed behind walls 46 which may also be extended about the casing 10 as indicated in Fig. 1 and are preferably painted or lined with a material to absorb the light rays that are not reflected forwardly from the spinning object.

While in the forms of the device disclosed, the annular members have a limited thickness, it is understood that the thickness or width of the rings may be varied within wide ranges for obtaining different or various effects.

This invention is an improvement upon the invention of Paul E. Klopsteg described and claimed in his Patent 1,630,490, May 31, 1927.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In an advertising device, a support of poorly conducting material, stationary means for producing a rotatory magnetic field over the support, and a light annular object containing conducting material on said support and adapted to be rotated by said field about a diameter normal to the support.

2. In an advertising device, a support of poorly conducting material, stationary means for producing a rotatory magnetic field over the support, an object of conducting material resting on the support and adapted to be rotated by the field about an axis normal to the support, a plurality of colored lights for illuminating said object, and means for intermittently energizing each of said lights.

3. In an advertising device, a support of non-conducting material, stationary means for producing a rotatory magnetic field above the support, a ring of conducting material having its outer rim surface resting on said support and adapted to be rotated by said field about a diameter normal to the support, and a legend supported within said ring.

4. In an advertising device, a support of non-conducting material, stationary means for producing a rotatory magnetic field above the support, a ring of conducting material having its outer rim surface resting on said support and adapted to be rotated by said field about a diameter normal to the support, said ring having projections on its edges.

5. In an advertising device, a support of non-conducting material, stationary means for producing a rotatory magnetic field above the support, a ring of conducting material having its outer rim surface resting on said support and adapted to be rotated by said field about a diameter normal to the support, said ring being highly polished on its outer surface and painted white on its inner surface.

6. In an advertising device, a support of non-conducting material, stationary means for producing a rotatory magnetic field above the support, a ring of conducting material having its outer rim surface resting on said support and adapted to be rotated by said field about a diameter normal to the support, a plurality of differently colored lights for illuminating said rings during its rotation and means for opening and closing the circuit of each light independently of the remaining lights and at irregular intervals.

7. In an advertising device, a support of non-conducting material, stationary means for producing a rotatory magnetic field above the support, a ring of conducting material having its outer rim surface resting on said support and adapted to be rotated by said field about a diameter normal to the support, a plurality of differently colored electric lights for illuminating said ring during its rotation, means for automatically independently opening and closing the circuit of each light and means for concealing said lights.

8. In an advertising device, a support of non-conducting material, stationary means for producing a rotatory magnetic field above the support, a display member containing conducting material on said support and adapted to be rotated by said field about an axis normal to the support, a plurality of lights of different colors for illuminating said member and means for automatically independently energizing each of said lights intermittently at indeterminate intervals.

9. In an advertising device, a support of non-conducting material, stationary means for producing a rotatory magnetic field above the support, a thin narrow band of conducting material on said support and adapted to be rotated by said field about an axis normal to the support whereby it is made to simulate the appearance of a transparent ball.

10. In an advertising device, a support of non-conducting material, stationary means for producing a rotatory magnetic field above the support, a ring of conducting material adapted to be rotated on said support by said field and about a diameter normal to the support, a colored electric light for illuminating said ring during its rotation and means for intermittently energizing said light.

In testimony whereof I affix my signature.

RICHARD M. SHERRILL.